United States Patent
Westlinning et al.

[11] 3,894,019
[45] July 8, 1975

[54] S-TRIAZINE DERIVATIVES CONTAINING NAPHTHYLAMINO GROUPS

[75] Inventors: Hermann Westlinning, Kleinostheim; Werner Schwarze, Frankfurt; Horst Fleischhauer, Grossauheim, all of Germany

[73] Assignee: Deutsche Gold- und Silber-Scheideanstalt vormals Roessler, Germany

[22] Filed: Nov. 9, 1972

[21] Appl. No.: 305,139

[30] Foreign Application Priority Data
Nov. 10, 1971 Germany.......................... 21557697

[52] U.S. Cl. ....... 260/249.5; 260/249.8; 260/249.6; 260/800
[51] Int. Cl. ..................... C07d 55/18; C07d 55/20
[58] Field of Search............ 260/249.5, 249.6, 249.8

[56] References Cited
UNITED STATES PATENTS

| | | | |
|---|---|---|---|
| 1,625,531 | 4/1927 | Fritzsche et al. | 260/249.5 |
| 2,720,480 | 10/1955 | Wolf | 167/33 |

FOREIGN PATENTS OR APPLICATIONS

| | | |
|---|---|---|
| 729,448 | 5/1955 | United Kingdom |
| 1,013,223 | 12/1965 | United Kingdom |
| 1,121,124 | 7/1968 | United Kingdom |
| 363,690 | 2/1932 | United Kingdom |
| 875,017 | 8/1961 | United Kingdom |

OTHER PUBLICATIONS
Chemical Abstracts, Vol. 52, p. 2728s.

*Primary Examiner*—John M. Ford
*Attorney, Agent, or Firm*—Cushman, Darby & Cushman

[57] ABSTRACT

Triazine derivatives for use as light and heat stabilizers and for improving fatigue properties in rubber vulcanizates have the following composition:

A 1,3,5-triazine derivative of the formula

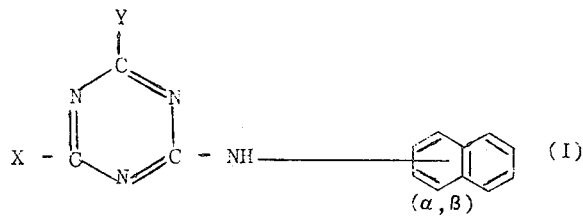

wherein X is

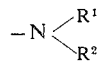

$-SR^6$
or chlorine, and Y is

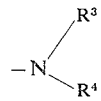

or $-SR^7$, $R^1$, $R^2$, $R^3$ and $R^4$ being hydrogen, alkyl of 1 to 18 carbon atoms, phenyl, allyl, or methallyl and wherein alkyl may be substituted by —OH, —OR$^5$ ($R^5$ being lower alkyl) or —CN and wherein $R^1$ and $R^3$ may also be α-naphthyl or β-naphthyl with the provision that the $R^2$ or $R^4$ group which is attached to the same N must then be hydrogen; and wherein $R^6$ and $R^7$ are alkyl of 1 to 18 carbon atoms or a thioether group of the formula

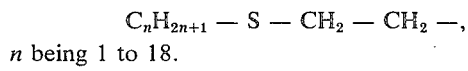

$n$ being 1 to 18.

The invention also embraces a vulcanizing process, a vulcanizable composition and a rubber vulcanizate including or using the above triazine derivatives.

30 Claims, No Drawings

S-TRIAZINE DERIVATIVES CONTAINING NAPHTHYLAMINO GROUPS

BACKGROUND OF THE INVENTION

The invention relates to naphthylamino groups containing 1, 3, 5-triazine derivatives and their use particularly as stabilizing agents for elastomer compositions.

Elastomer vulcanizates undergo structural changes with increasing lifetime which result in an impairment of their use. The changes are caused by the action of oxygen, ozone, light and heat, either singly or in combination of these actions. If there is simultaneously a dynamic stress on the elastomer-vulcanizate the deleterious action is further increased. A number of materials have become known which are used to stabilize the elastomers against these deleterious effects. They are usually called antioxidants and may also be called anti-ageing agents.

While normal arylamines for instance α- or β-naphthylamines do not have any antiageing effects or have only a very faint activity in this direction it is known that by substituting a phenyl ring for a hydrogen atom of a naphthylamine the highly effective antioxidants phenyl-α-naphthylamine (= PAN) and phenyl-β-naphthylamine (= PBN) are obtained. However, these compounds have the shortcoming that they result in a strong discoloration of white or light colored elastomer vulcanizates under the action of light. In case of carbon black containing mixtures the formation of discoloring compositions results in color transfers which reduce the usefulness of the compositions wherever the vulcanizates come into contact with bright or light-colored materials, for instance paper, synthetic plastics or coating materials such as lacquers. These color transfers upon contact are well known and dreaded in the automotive industry.

1, 3, 5-triazine derivatives of various kinds have been used for various purposes. For instance these triazine derivatives are used with 2-, 4-, and/or 6-position halogen atoms and sulfur and/or nitrogen-containing substituents. It has also been proposed to use these materials as stabilizers for organic substances such as polymers (U.S. Pat. Nos. 3,240,749, 3,245,992, 3,257,354, 3,418,272, 3,530,127, British Patent 977,589, French patent 675,785, etc.).

For instance in U.S. Pat. No. 3,257,354 it has been proposed to protect natural rubber or synthetic rubber such as cis-polyisoprene or a styrene-butadiene elastomer against oxidative degradation with such triazine compounds as are obtained from derivatives containing phenyl groups with free OH groups. The activity of these compounds is clearly based only on the presence of free phenol groups.

Other triazine derivatives are for instance disclosed in German published applications 1,240,083 and 1,241,452 for use as protection of organic materials against ultraviolet radiation. These compounds however likewise contain phenyl substituents with free OH groups.

The above-mentioned French patent discloses numerous derivatives of the s-triazines since the triazine ring can be substituted by a large number of substituents not further defined therein. These substituents can be attached either directly to the triazine ring or via hetero atoms such as oxygen, nitrogen or sulfur. Among these compounds are many triazine derivatives which have no antioxidant effect at all in elastomer vulcanizates. The few compounds specifically mentioned in the examples of the French patent do not afford any mentionable age protection in vulcanizates as has been determined by test results. There is furthermore not indicated in the French patent any rule by which effective antioxidants or age protectors can be determined among the numerous and highly different triazine derivatives.

It could accordingly not be foreseen which particular 1,3,5-triazine derivatives would have valuable and superior properties for the elastomer vulcanization. The present inventors have found that, surprisingly, among the very large number of triazine derivatives there is a group of such derivatives which are highly effective antioxidants and have other valuable properties for the elastomer vulcanization.

SUMMARY OF THE INVENTION

The invention accordingly resides in 1,3,5-triazine derivatives of the formula

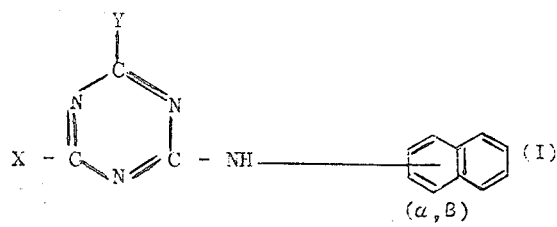

wherein X is

—SR$^6$ or chlorine, and Y is

or —SR$^7$,

R$^1$, R$^2$, R$^3$ and R$^4$ being hydrogen, alkyl of 1 to 18 carbon atoms, phenyl, allyl, or methallyl and wherein alkyl may be substituted by —OH, —OR$^5$ (R$^5$ being lower alkyl) or —CN and wherein R$^1$ and R$^3$ may also be α-naphthyl or β-naphthyl with the provision that the R$^2$ or R$^4$ group which is attached to the same R must then be hydrogen; and wherein R$^6$ and R$^7$ are alkyl of 1 to 18 carbon atoms or a thioether group of the formula $$C_nH_{2n+1} — S — CH_2 — CH_2 —,$$

n being 1 to 18.

The invention also is directed to a vulcanizable rubber or elastomer composition containing sulfur or a sulfur liberating compound (donor or donator) and at least one vulcanizing accelerator and optionally an organic peroxide crosslinking agent and/or a filler in which the above triazine derivatives are used as antioxidants, heat and light stabilizers and rubber fatigue reducing agents. The invention also is directed to the process of vulcanizing a vulcanizable composition in which the above compounds are used as stabilizers and to a vulcanizate thus obtained.

DETAILS OF THE INVENTION AND PREFERRED EMBODIMENTS

The alkyl groups present in the triazine derivatives may be straight or branched groups. If the alkyl groups are substituted they are preferably monosubstituted but may also be bi-substituted. The reference to lower alkyl groups implies alkyl having 1 to 4 carbon atoms.

The triazine compounds may be made in various manners. Preferably the starting product for the synthesis is cyanuric chloride which preferably is first reacted with a naphthylamine ($\alpha$ or $\beta$) in the presence of an HCl acceptor so as to form 2-$\alpha$- (or $\beta$)-naphthylamino-4,6-dichlorotriazine.

If in the synthesis 4,6-bis-alkylmercapto-2-($\alpha$ or $\beta$) naphthylamino trizine derivative is used the same is then further reacted with a mercaptan in the presence of an HCl acceptor. For this purpose the alkali salts of the mercaptans can also be used.

If 2- ($\alpha$ or $\beta$) - naphthylamino-6-amino substituted 4-chloro-triazines are to be made a 2- ($\alpha$ or $\beta$) -naphthylamino-4,6-dichloro triazine is reacted with ammonia or an amine at temperatures around about 50°C. As HCl acceptors the amines used in the reaction mixture or bases of the alkali or earth alkali metals may be used.

It will be understood that the procedure can also be reversed by first reacting the cyanuric chloride with ammonia or an amine and then subsequently reacting it with a naphthylamine.

2-($\alpha$ or $\beta$)-naphthylamino-4-amino- or 4-alkylamino-6-alkylmercapto triazines are made from the corresponding 6-chloro triazines and a mercaptan in the presence of an HCl acceptor.

If it is desired to make 2- ($\alpha$ or $\beta$)-naphthylamino-4-chloro-6-alkylmercapto triazines the reaction is for instance carried out between a 2,4-dichloro-6-alkylmercapto triazine and $\alpha$- or $\beta$-naphthylamine in the presence of an HCl acceptor.

2-$\alpha$ or $\beta$-naphthylamino-4,6-bis-amino- or -4-alkylamino-6-aminotriazine are made from 2-naphthylamino-4-amino- or -4-alkyl-amino-6-chlorotriazines and ammonia or amines at an elevated temperature, preferably above 60°C.

The following is a representative list of compounds and some of their properties which come under the above generic formula:

| Type of naphthylamine | Y | X | m.p. | Appearance of crystals or oils | Yield | Product Designation |
|---|---|---|---|---|---|---|
| $\alpha$— | —NH$_2$ | —Cl | 158–160 | white | 90.5 | IN 46 |
| $\beta$— | —NH$_2$ | —Cl | 245–246 | " | 93.0 | " 39 |
| $\alpha$— | —NHC$_2$H$_5$ | —Cl | 180–182 | " | 90.0 | " 49 |
| $\alpha$— | —NHC$_4$H$_9$—n | —Cl | 156–158 | " | 92.0 | " 50 |
| $\beta$— | —N(C$_2$H$_5$)$_2$ | —Cl | 138–139 | " | 97.8 | " 38 |
| $\alpha$— | —N-H—CH$_2$.CH=CH$_2$ | —Cl | 158–160 | " | 95.0 | " 45 |
| $\beta$— | —N-H—CH$_2$.CH=CH$_2$ | —Cl | 224–226 | " | 91.3 | " 37 |
| $\alpha$— | —NHC$_6$H$_5$ | —Cl | 135–137 | " | 100.0 | " 74 |
| $\beta$— | —NHC$_6$H$_5$ | —Cl | 226–228 | " | 93.1 | " 41 |
| $\alpha$— | —N(CH$_2$.CH=CH$_2$)(CH$_2$.CH=H$_2$) | —Cl | 135–136 | " | 91.5 | " 47 |
| $\alpha$— | —NH—$\alpha$—Naphthyl | —Cl | 204–205 | " | 91.0 | " 48 |
| $\beta$— | —SCH$_3$ | —Cl | 208–209 | light yellow | 82.0 | " 54 |
| $\alpha$— | —SC$_8$H$_{17}$ | —Cl | oil | " | 91.5 | " 68 |
| $\alpha$— | —NH—i—Propyl | —Cl | 173–174 | light grey | 97.1 | " 67 |
| $\alpha$— | —NH—Butyl—t | —Cl | 133–135 | " | 93.4 | " 66 |
| $\alpha$— | —NH—CH$_2$CH$_2$OH | —Cl | 175–177 | white | 75.4 | " 64 |
| $\alpha$— | —N(CH$_2$CH$_2$OH)(CH$_2$CH$_2$OH) | —Cl | 135–137 | " | 78.1 | " 65 |
| $\alpha$— | —SCH$_3$ | —Cl | 155–156 | light yellow | 84.5 | " 51 |
| $\beta$— | —SCH$_3$ | —NH$_2$ | 208–209 | " | | " 40 |
| $\beta$— | —SCH$_3$ | —N(C$_2$H$_5$)$_2$ | 104–105 | " | | " 42 |
| $\beta$— | —NH—$\beta$—Naphthyl | —Cl | 245 | | | " 53 |
| $\alpha$— | —NHCH$_2$.CH=CH$_2$ | —SC$_8$H$_{17}$ | oil | | 80.0 | " 69 |
| $\beta$— | —NHCH$_2$CH=CH$_2$ | —NHCH$_2$CH=CH$_2$ | | yellow | | " 70 |
| $\alpha$— | —SCH$_3$ | —SCH$_3$ | 127–129 | white | 62.0 | " 27 |
| $\beta$— | —SCH$_3$ | —SCH$_3$ | 178–179 | white | 93.0 | " 28 |
| $\alpha$— | —SC$_8$H$_{17}$ | —SC$_8$H$_{17}$ | 43–45 | grey | 80.3 | " 43 |
| $\alpha$— | —SC$_{12}$H$_{25}$ | —SC$_{12}$H$_{25}$ | 69–70 | " | 81.5 | " 44 |
| $\alpha$— | —SCH$_2$CH$_2$SC$_8$H$_{17}$ | —SCH$_2$CH$_2$SC$_8$H$_{17}$ | 30–34 | greasy looking | 64.1 | " 72 |
| $\alpha$— | —SCH$_2$CH$_2$SC$_{12}$H$_{25}$ | —SCH$_2$CH$_2$SC$_{12}$H$_{25}$ | 63–64 | light yellow | 90.7 | " 71 |
| $\beta$— | —N(CH$_2$.CH=CH$_2$)(CH$_2$.CH=CH$_2$) | —Cl | 115 | white | 87.5 | " 52 |
| $\beta$— | —NH—$\beta$—Naphthyl | —SCH$_3$ | 174–176 | " | 81.5 | " 57 |
| $\beta$— | —NH—C$_6$H$_5$ | —NHC$_6$H$_5$ | 228–230 | " | 71.5 | " 73 |

Additional examples of naphthylamino triazine are the following:

2-$\alpha$- or -$\beta$-naphthylamino-4-chloro-6-mono-or -dimethallylamino-s-triazine, 2-$\alpha$-or -$\beta$-naphthylamino- 4-amino-6-mono-or -6-dimethallylamino-s-triazine, 2-α-or -β-naphthylamino-4,6-bis-(mono-or -dimethallylamino)-s-triazine, 2α-or -β-naphthylamino-4-mono-or -4-diethylamino-6-mono-or -6-dimethallylamino-s-triazine, 2-α-or -β-naphthylamino-4-methylthio-6-mono-or -6-dimethallylamino-s-triazine as well as the corresponding -4-ethylthio-, 4-n-propylthio-, -4-i-propylthio-, 4-n-butylthio-, -4-i-butylthio-, -4-n-pentylthio-,4-i-pentylthio...-s-triazines etc.

Further examples are:

2-α-or -β-naphthylamino-4-ethylthio-or 4-n-propylthio-6-ethylthio-or 6-n-propylthio-s-triazine as well as the corresponding -bis-4,6-i-propylthio-, -n-butylthio-,i-butylthio-,n-pentylthio-, -i-pentylthio-, -2-ethyl-propylthio-, -n-heptylthio-,-n-octylthio-...up to -octadecylthio-s-triazine et.

Further noted are:

2-α-or -β-naphthylamino-4-chloro-6-mono-or -dihydroxypropylamino-s-triazine, 2-α-or -β-naphthylamino-4-chloro-6-mono-or -bis-(4-hydroxybutyl)-amino-s-triazine,2-α-or -β-naphthylamino-4-chloro-6-mono-or -6-bis-(3,4-dihydroxybutyl)-amino-s-triazine. 2-α-or -β-naphthylamino-4,6-bis (dihydroxy-ethylamino)-s-triazine, 2,6-α-or -β-bis-naphthylamino-4-mono-or -bis-(2-hydroxyethylamino-s-triazine, 2,6-αor.-β-bis-naphthylamino-4-mono-or -diallylamino-s-triazine, 2,6-α-or -β-bis-naphthylamino-4-mono-or -diethylamino-s-triazine, 2,6-α-or. β-bis-naphtylamino-4-methylthio-s-triazine and the corresponding -4-ethylthio-,4-n-propylthio-, -4-i-propylthio-, -4-n-butylthio-, -4-i-butylthio-,-4-(2-methylbutyl)-thio-, -4-pentylthio-, -4-hexylthio-, -4-heptylthio-, -4-octylthio-, ... etc. up to -4-octadecylthio-s-triazine.

Likewise useful are:

2-α-or -β-naphthylamino-4-chloro-6-mono-or -bis-(methoxyethyl)-amino-s-triazine, 2-α-or -β-naphthylamino-4-chloro-6-mono-or -bis-(3-methoxy-propyl)-amino-s-triazine, 2-α-or -β-naphthylamino-4-chloro-6-mono-cr -bis-(3-butoxy-propyl) -amino-s-triazine, 2-α-or -β-naphthylamino-4-chloro-6-mono-or -bis-(3,4-diethoxybutyl)-amino-s-triazine, 2-α-or -β-naphthylamino-4-chloro-6-mono-or -bis-(cyanomethyl)-amino-s-triazine, 2-α-or -β-naphthylamino-4-chloro-6-mono-or -bis-(3-cyanopropyl)-amino-s-triazine, and 2-α-or 2-β-naphthylamino-4,6-bis(3-butoxy-propylamino)-s-triazine.

Another representative group comprises:

2-α-or 2-β-Naphthylamino-4,6-bis-(3-cyanopropylamino)-s-triazine, 2-α- or 2-β-naphthylamino-4-octadecylthio-6-mono-or -bis-(3-methoxy-propyl)-amino-s-triazine, 2-α-or 2-β-naphthylamino-4-pentylthio-6-mono-or -bis-(3-cyanopropyl)-amino-s-triazine, 2-α-or 2-β-naphthylamino-4-methylthio-6-mono-or -bis-(3-methoxy-propyl)-amino-s-triazine, 2,6-bis-α-or -β-naphthylamino-4-mono-or bis-(2-cyanoethyl)-amino-s-triazine, and 2,6-bis-α-or -β-naphthylamino-4-mono-or -bis-(3-methoxypropyl)amino-s-triazine.

METHODS OF MAKING THE TRIAZINE DERIVATIVE

The following illustrates a few examples of methods for making specific triazine derivatives.

A. A suspension was set up of 184.5 g cyanuric chloride in 400 ml acetone and 400 ml ice water. An acetone solution of 145 g β-naphthylamine was then added dropwise at a temperature of 0° to 5°C while the mass was vigorously stirred and subjected to cooling. Subsequently a solution of 40 g NaOH in 200 ml water was added dropwise at a temperature of between 0° and 5°C. The mixture then had a neutral reaction. The cooling was thereupon discontinued and 58 g of allylamine were slowly poured into the mixture. The temperature now rose to about 20°C.

A solution of 40 g NaOH in 150 ml water was then slowly added causing the temperature to rise to about 45°C. After 2 hours the reaction mass had a neutral reaction. Water (2 liters) was added and the crystals were removed by suction filtration, washed and dried in a vacuum. There were obtained white crystals at a melting point of 224° to 226°C. The yield was 284 g of 2-β-naphthylamino-4-allylamino-6-chlorotriazine corresponding to 91.3% of the theoretical yield.

B. 291.2 g of 2-β-naphthylamino-4,6-dichlorotriazine were dissolved in 1.5 l dioxane. 115 g of allylamine were then added dropwise at a temperature up to 45°C. Thereafter another 115 g allylamine were added to the solution and the mixture was transferred to an autoclave. There it was subjected to heating for 4 hours to 100° to 110°C and subsequently further processed as above. The crystals obtained were recrystallized from ethyl acetate. There were thus obtained bright yellow crystals of a melting point of 161° to 63°C. The yield was 214.3 g of 2g -β-napththylamino-4,6-bis-allylamino-s-triazine corresponding to 67.4% of the theoretical yield.

C. 46 g of sodium were suspended in 1 liter toluene and subjected to heating to 90°C while vigorously stirring. 404 g of n-dodecylmercaptan were then slowly added dropwise to the suspension. The sodium salt of the mercaptan was thus formed. The temperature was then reduced to 40°C and 291.2 g of 2-α-naphthylamino-4,6-dichlorotriazine were added. The mass was subsequently heated for another 6 hours over a boiling water bath. The mixture now reacted neutral. It was cooled, and washed with water. Subsequently the toluene was evaporated in a vacuum. The residue was removed with alcohol. This resulted in rapid formation of crystals. The crystals were removed by filtration suction and washed with methanol. They were grey crystals of a melting point of 69° to 70°C. The yield was 507 g of 2-α-naphthylamino-4,6-bis-n-dodecylmercapo-s-triazine. This corresponded to a theoretical yield of 81.5%.

D. 196 g of 2,4-dichloro-6-methylmercapto-triazine were dissolved in 1000 ml acetone and subjected to cooling to 0°C. A solution of 145 g of α-naphthylamine in 750 ml acetone were then added dropwise while stirring at a temperature of 0° to 10°C. Thereafter a solution of 40.1 g of NaOH in 400 ml H₂O was likewise added dropwise. This resulted in an increase of the temperature to at most 40°C. After 2 hours the mixture had a neutral reaction. It was poured then into 2.5 l of water and the formed light yellow crystals were removed by filtration suction and subjected to drying at 40°C in a vacuum. The yield of 6-methylmercapto-2-α-naphthylamino-4-chlorotriazine was 275 g. This corresponded to 91% of the theoretical yield. The melting point was 204° to 205°C.

The novel naphthylamino triazines can for instance advantageously be used in the elastomer industry as highly effective antioxidants and antifatigue agents which are not discoloring or cause only very faint color modifications.

Accordingly vulcanizates can be stabilized by vulcanizing a vulcanizable elastomer mixture which may contain a filler while using the naphthylamino containing triazines of the above formula I as stabilizing agents.

As elastomers all natural or synthetic elastomers or blends thereof may be used which can be cross-linked and for instance may be vulcanized or cross-linked with peroxides or sulfur and/or sulfur donators such as N,N'-dithiobismorpholine, dipentamethylenthiuramtetrasulfide, N,N'-dithiobishexahydro-2H-azepinone-(2), 2-benzthiazyldithio-β-morpholide. For the vulcanization a conventional vulcanization accelerator system may be used, if desired, in the presence of fillers, preferably so-called active or reinforcing fillers or filler mixtures. As examples of the elastomers are particularly mentioned the following: styrene-butadiene elastomers (SBR), natural rubber (NR), nitril elastomers (NBR), polybutadiene (BR), polyisoprene (IR), polychloroprene (CR), the well known polymers of two olefins and possibly including a polyene hydrocarbon, particularly diene hydrocarbons, and transpolypenteneamers, see Zeitschrift Kautschuk und Gummi, Kunststoffe 23, 502 ff. (1970).

Several different elastomers and elastomers together with natural rubber may be used in the form of blends.

As cross-linking agents there may also be used the usual peroxides such as dicumyl peroxide or also oxides of bivalent metals, for instance, magnesium, zinc or lead oxides.

For the vulcanization with sulfur an accelerator may be used as follows either singly or in combination:
benzothiazole, such as 2-mercaptobenzthiazole, dibenzothiazyldisulfide and sulfenamides of 2-mercaptobenzthiazole;
diphenylguanidine;
2-mercaptoimidazoline;
mercaptotriazines, such as mono- and di-mercaptotriazines and their sulfenamides disulfides and polysulfides and thiurames such as tetraalkylthiruammono or disulfides.

The vulcanization is carried out as usual. The conventional amounts of sulfur, sulfur donator, accelerator peroxide and, if wanted, fillers are used. The vulcanization is effected at conventional temperatures, for instance from 100° to about 300°C, preferably between about 120° and 240°C for conventional periods of time which is preferably between 15 and 30 minutes or higher if necessary. The processes and apparatus used may be those conventionally employed in this connection for instance heating with steam, hot air, by means of a salt bath, fluidizing bed, ultra-high frequency and steam pipe.

The accelerators or combinations of accelerators may also be used together with zinc oxide and/or stearic acid.

The invention accordingly involves the use of the 1,3,5-triazines as described, preferably at least one of these triazines, as stabilizers for vulcanizates obtained from vulcanizable elastomer mixtures. The stabilizers of the invention may be used in combination with conventional stabilizers and antioxidants.

The invention accordingly further embraces also a vulcanizable mixture consisting of at least one elastomer, sulfur and/or a sulfur donator and at least one accelerator for the vulcanization or at least one organic peroxide and optionally a filler. The usual vulcanization additives employed in industry may be used in the mixture. The mixture further must contain at least one of the triazines of the invention which may be used in combination with conventional stabilizers and antioxidant agents as already stated. These mixtures can then be vulcanized or cross-linked and shaped in conventional manner.

All conventional additives may be used such as plasticizers, mineral oils, adhesion promoters, accelerators, activators like stearic acid and also zinc oxide, waxes, propelling agents, pigments, special ozone protectors and dyes.

Into the vulcanizable mixture there may be incorporated fillers such as the conventional carbon black types, furthermore finely divided silica, particularly $SiO_2$ (silicic acid) obtained from the gas phase or by precipitation from alkali metal silicate solution. Useful in this connection are silicates of the same type as the just-described silicic acid as well as hydrophobized silicic acid and silicates and furthermore metal oxides including the so-called mixed oxides and oxide mixtures. Also useful are synthetic and natural chalks, kaolins, silica-chalks etc.

The stabilizers of the invention may be used in an amount of between 0.05 to 10 parts by weight relative to 100 parts of polymer. Preferably the amounts are 0.1 to 5 parts by weight (phr). As already indicated several of the stabilizers may be used in combination and the stabilizers of the invention may also be combined with conventional antioxidants or age protectors if non-discoloration is sacrificed. Such conventional materials are for instance phenyl-α-naphthylamine (PAN), phenyl-β-naphthylamine (PBN), N-phenyl-N'-cyclohexyl-p-phenylendiamine, N-phenyl-N'-isopropyl-p-phenylenediamine, N-(1,e-dimethylbutyl)-N-phenyl-p-phenylenediamine, 6-ethoxy-1,2-dihydro-2,2,4-trimethylchinoline, 2,6-di-tert.-butyl-p-cresol, 4,4'-dioxydiphenyl etc.

Regarding the activity of the stabilizers of the invention it is again noted that they provide an effective protection against fatigue in case of dynamic stress as well as against aging, particularly at higher temperatures. In addition they have the heretofore not obtainable advantage of non-discoloration under the action of light whilst at the same time protecting the vulcanizates against fatigue.

The following examples will further illustrate the invention.

EXAMPLE I

For test purposes vulcanizates were formed with three different natural rubber mixtures as follows:

| Components | Test Composition No. (parts by weight) | | |
|---|---|---|---|
| | 1 | 2 | 3 |
| Natural rubber | 100 | 100 | 100 |
| Precipitated calcium carbonate | 65 | 65 | 65 |
| Stearic acid | 2 | 2 | 2 |
| Zinc oxide | 5 | 5 | 5 |
| Titanium dioxide | 15 | 15 | 15 |
| PBN (phenyl-β-naphthylamine) | 1 | — | — |

-Continued

| Components | Test Composition No. (parts by weight) | | |
|---|---|---|---|
| | | | |
| IN 27[(1)] | — | 1 | — |
| IN 28[(2)] | — | — | 1 |
| Dibenzothiazyldisulfide | 1 | 1 | 1 |
| Tetramethylthiuram monosulfide | 0.1 | 0.1 | 0.1 |
| Sulfur | 2.5 | 2.5 | 2.5 |

[(1)]IN 27 is 2-α-naphthylamino-4,6-bismethylmercapto-triazine
[(2)]IN 28 is 2-β-naphthylamino-4,6-bismethylmercapto-triazine The vulcanization was effected at 134°C for a time of 20 minutes. The vulcanized specimens were then subjected to ageing for 8 days at 100°C in a heat cabinet having circulation of the air. After that time they were examined for crack formation (cut growth). This examination was carried out in accordance with the test program described in De Mattia, DIN 53 522, sheet 1 and 2 (corresponding to ASTM D 430 B or draft ISO-Recommendation No. 172).

The number of bends necessary to reach stage E in accordance with DIN 53 522, sheet 2 (German Industrial Norms) was found to be as follows:

For mixture No. 1 (prior art) 7,000 bends
For mixture No. 2 (invention) 8,750 bends
For mixture No. 3 (invention) 10,000 bends As appears both of the stabilizers of the invention (IN 27 and IN 28) provide a substantially higher protection against crack formation on bending than the conventional PBN used in the rubber industry.

With the stabilizers employed in this example no or only a very faint discoloration under the action of light was observed. This is contrary to the results with PBN containing vulcanizates which are subject to heavy discoloration under the action of light as will further appear from the following example:

EXAMPLE II

Several natural rubber compositions were specifically tested for discoloration under the action of light. This type of rubber composition is particularly suitable for examining light stability. The compositions were as follows:

| | Test Composition No. (parts by weight) | | |
|---|---|---|---|
| | 1 | 2 | 3 |
| Natural rubber (first crepe) | 100 | 100 | 100 |
| Natural chalk | 100 | 100 | 100 |
| Stearic acid | 1 | 1 | 1 |
| Zinc oxide | 5 | 5 | 5 |
| Titanium dioxide | 5 | 5 | 5 |
| PBN | 3 | — | — |
| IN 27 (see Ex. 1) | — | 3 | — |
| IN 28 (see Ex. 1) | — | — | 3 |
| Dibenzothiazyldisulfide | 1 | 1 | 1 |
| Tetramethylthiuram monosulfide | 0.2 | 0.2 | 0.2 |
| Sulfur | 2.2 | 2.2 | 2.2 |

The vulcanization was carried out at 150°C for a time of 20 minutes. The specimens of the vulcanizates were then exposed for 96 hours to the radiation of a Xenotest apparatus 150, System Casella, original Hanau (following DIN 53 388 or draft ISO recommendation No. 759). The tests were carried out at room temperature at a relative humidity of the air of 60 to 70%.

The test results regarding colors and color modification were as follows:

| Test mixture | 1 (prior art) | 2 (invention) | 3 (invention) |
|---|---|---|---|
| Color result | very distinct brown | faintly yellowish | extremely slight yellowish |

Particularly the color modification of the vulcanizates of composition No. 3 in which the stabilizer IN 28 was used extremely faint. This modification can be compared with that resulting from the use of high quality, non-discoloring age protectors which however do not afford any protection against fatigue properties.

This shows that the naphthylamino-triazines of the invention are antioxidants which do not result in discoloration or result in an only faint discoloration and at the same time afford a high protection in case of dynamic stress.

A surprising further result of the investigation was that the activity against destruction of the vulcanizates by crack formation in case of dynamic stress can be increased substantially if one of the substituents on the triazine ring is a chlorine atom. With thus substituted compounds no undesirable effect is found regarding the general protection against discoloration by the stabilizers of the invention. All this is further illustrated in the following example.

EXAMPLE III

The following elastomer mixture was set up:

| Components (in parts by weight) | |
|---|---|
| Oil extended styrene-butadiene elastomer containing 23.5% bound styrene and 37.5% highly aromatic extender oil (Buna Hüls 1712) | 96.5 |
| Cis-polybutadiene elastomer (Buna CB 10) | 30 |
| HAF-carbon black N 330 (Corax 3 of Degussa Inc., New York, N.Y.) | 75 |
| Stearine acid | 1.2 |
| Zinc oxide | 4 |
| Highly aromatic hydrocarbon as plasticizer (Naftolen ZD) | 15 |
| Stabilizer (see Table below) | 3 |
| Benzothiazyl-2-cyclohexylsulfenamide | 1.2 |
| Sulfur | 1.6 |

The vulcanization was effected at a temperature of 160°C. The tests of the vulcanizates were carried out according to the procedure described in DIN 53 522, sheet 3 (corresponding to draft ISO recommendation No. 173 or ASTM D 813/1965).

The antioxidants used in this example were the following:

1. Phenyl-β-naphthylamine (PBN)
2. IN 39 = 2-β-naphthylamino-4-chloro-6-amino-triazine
3. IN 45 = 2-α-naphthylamino-4-chloro-6-allylamino-triazine
4. IN 37 = 2-β-naphthylamino-4-chloro-6-allylamino-triazine
5. IN 41 = 2-β-naphthylamino-4-chloro-6-anilino-triazine
6. IN 38 = 2-β-naphthylamino-4-chloro-6-diethylamino-triazine
7. IN 46 = 2-α-naphthylamino-4-chloro-6-amino-triazine
8. IN 47 = 2-α-naphthylamino-4-chloro-6-diallylamino-triazine
9. IN 48 = 2,6 bis-α-naphthylamino-4-chloro-triazine
10. IN 49 = 2-α-naphthylamino-4-chloro-6-ethylamino-triazine 11. IN 50 = 2-α-naphthylamino-4-chloro-6-n-butylamino-triazine
12. IN 51 = 2-α-naphthylamino-4-chloro-6-methylmercaptotriazine The tests for fatigue properties were carried out according to the De Mattia as in Example I. After 8 days of hot air ageing at 100°C the following bend numbers were established for a cut growth of the length of the cut from 4 to 8 mm:

| Vulcanizate No.: | 1 | 2 | 3 | 4 | 5 | 6 |
|---|---|---|---|---|---|---|
| Containing: | PBN (Control) | IN 39 | IN 45 | IN 37 | IN 41 | IN 38 |
| Number of bends | 990 | 2100 | 2200 | 5530 | 1300 | 1680 |

| Vulcanizate No.: | 7 | 8 | 9 | 10 | 11 | 12 |
|---|---|---|---|---|---|---|
| | IN 46 | IN 47 | IN 48 | IN 49 | IN 50 | IN 51 |
| Number of bends | 2300 | 3350 | 1770 | 1900 | 1250 | 1600 |

The activity against age phenomena of the stabilizers of the invention is hihg also if no ageing takes place. In this connection the following bend figures were established for the same 12 antioxidants and for the same type of test except that the growth of the cut length was determined for an increase from 2 to 4 mm.

| Vulcanizate No.: | 1 (control with PBN) | 2 | 3 | 4 | 5 | 6 |
|---|---|---|---|---|---|---|
| Number of bends | 4230 | 9300 | 7600 | 10350 | 4400 | 5800 |

| Vulcanizate No.: | 7 | 8 | 9 | 10 | 11 | 12 |
|---|---|---|---|---|---|---|
| Number of bends | 8600 | 7400 | 8700 | 6400 | 6500 | 5600 |

A further test without ageing was then carried out to determine the cut growth from 4 to 8 mm:

| Vulcanizate No.: | 1 | 2 | 3 | 4 | 5 | 6 |
|---|---|---|---|---|---|---|
| Number of bends | 6600 | 19200 | 12400 | 14150 | 7200 | 9450 |

| Vulcanizate No.: | 7 | 8 | 9 | 10 | 11 | 12 |
|---|---|---|---|---|---|---|
| Number of bends | 15400 | 8600 | 9800 | 7200 | 8400 | 8400 |

Naphthylamino-chloro-triazines according afford a substantially improved protection against fatigue properties of elastomers both in aged and unaged condition.

It is noted that all vulcanizates in these tests and within reasonable limits of error were adjusted to the same tensile stress values in order to obtain comparable conditions of stress during bending tests. (See also the following Example IV).

The following Example shows the modification of other properties observed in connection with the antioxidant properties of the stabilizers of the invention in case of hot air aging.

EXAMPLE IV

Vulcanizates formed as in Example III were subjected to hot air aging for a period of 8 days at 100°C.

The figures at (a) are the initial values in unaged condition and the figures at (b) show the changes in these values expressed in per cent of the initial values except that in case of the Shore hardness the changes are indicated in points.

| Stabilizer | Tensile strength kp/cm² | Tensile stress at 200% elongation kp/cm² | Elongation at fraction % | Shore-A hardness |
|---|---|---|---|---|
| 1. PBN a) | 176 | 30 | 655 | 55 |
| b) | −20 | +187 | −54 | +10 |
| 2. IN 39 a) | 161 | 28 | 705 | 56 |
| b) | −19 | +186 | −50 | +9 |
| 3. IN 45 a) | 175 | 33 | 690 | 59 |
| b) | −19 | +124 | −48 | +5 |
| 4. IN 37 a) | 162 | 30 | 665 | 58 |
| b) | −16 | +123 | −42 | +6 |
| 5. IN 41 a) | 180 | 37 | 655 | 58 |
| b) | −26 | +111 | −52 | +7 |
| 6. IN 38 a) | 176 | 31 | 650 | 55 |
| b) | −22 | +155 | −52 | +8 |
| 7. IN 46 a) | 173 | 26 | 690 | 56 |
| b) | −24 | +177 | −51 | +9 |
| 8. IN 47 a) | 173 | 28 | 640 | 55 |
| b) | −25 | +96 | −41 | +7 |
| 9. IN 48 a) | 157 | 26 | 640 | 54 |
| b) | −26 | +150 | −52 | +7 |
| 10. IN 49 a) | 168 | 28 | 605 | 55 |
| b) | −27 | +146 | −49 | +8 |
| 11. IN 50 a) | 167 | 29 | 605 | 54 |
| b) | −34 | +134 | −51 | +8 |
| 12. IN 51 a) | 168 | 30 | 605 | 55 |
| b) | −22 | +140 | −47 | +9 |

As appears by a suitable selection of the substituents R' of the stabilizers under formula I it is possible to reduce the increase of the Shore hardness under the action of hot air to about one half of the increase obtained with PBN. The simultaneous lower increase of the tensile stress at 200% elongation shows that the vulcanizates in case of employment of the naphthylamino-chloro-triazines are subject to substantially lower hardening or rigidifying under the action of heat and oxygen as in case of the use of PBN. The reduction of the rigidification is a problem on which the rubber article and rubber tire industry has spent large amounts of money since the rigidification results in a reduction of the time of usefulness of the rubber articles.

The following Example illustrates that the naphthylamino-chloro-triazines which afford particularly good protection against appearance of fatigue properties likewise result only in a very minor color modification.

EXAMPLE V

In this case vulcanizates were tested which contained the antioxidants identified as IN 39, 45, 37, 41, 38 and 46 to 51, (see also Example III above). The vulcanizates were tested on the basis of the same compositions and same procedure as described in Example II. The appearance of the specimens after exposure to light for 8 days was as follows:

PBN very dark brown
IN 39 very minute yellowish coloring, hardly visible
IN 45 faintly yellowish
IN 37 very minute yellowish coloring, hardly visible
IN 41 faintly yellowish
IN 38 faintly yellowish
IN 46 yellowish
IN 47 faintly yellowish
IN 48 brownish to yellow IN 49 yellowish
IN 50 yellowish
IN 51 brownish to yellow This shows that even with use of the naphthylamino-chloro-triazines the effects on the color are comparable to those obtained with prior art non-discoloring antioxidants which however do not afford any protection against appearance of fatigue properties. This proves that the stabilizers of the invention combine the highly effective antioxidant action with protection against fatigue properties and an absence of any strong discoloration.

The following example illustrates that the napthylamino triazines of the invention are effective as fatigue reducing agents and antioxidants in polymers also which include for instance mixtures of oil extended styrene-butadiene elastomer and polybutadiene elastomer.

This type of elastomer mixture is in broad use for making automobile tires and in particular the treads of the tires of passenger cars.

EXAMPLE VI

The stabilizers used as antioxidants or age protectors were the following:
1. phenyl-$\beta$-naphthylamine (=PBN) (for comparative purposes)
2. IN 78 = 2-$\alpha$-naphthylamino-4,6-bis-allylamino-s-triazine
3. IN 77 = 2-$\alpha$-naphthylamino-4-allylamino-6-n-octylthio-s-triazine
4. IN 69 = 2-$\alpha$-naphthylamino-4,6-bis-n-dodecylthio-n-ethylthio-s-triazine
5. IN 43 = 2-$\alpha$-naphthylamino-4,6-bis-n-octylthio-s-triazine
6. IN 44 = 2-$\beta$-naphthylamino-4,6-bis-n-dodecylthio-s-triazine
7. IN 57 = 2,6-bis-$\beta$-naphthylamino-4-methylthio-s-triazine
8. IN 40 = 2-$\beta$-naphthylamino-4-methylthio-6-amino-s-triazine.

These stabilizers were in vulcanizates of mixtures of the following composition:

| Components in parts by weight | |
|---|---|
| Oil extended styrene-butadiene elastomer containing 23.5% bound styrene and 37.5% of highly aromatic extender oil (Buna Huls 1712) | 96.5 |
| Cis-polybutadiene elastomer (Buna CB 10) | 30 |
| BAF carbon black N 330 (Corax 3 of the Degussa Co. of Germany) | 75 |
| Stearic acid | 1.2 |
| Zinc oxide | 4 |
| Highly aromatic hydrocarbon as plasticizer (Naftolen ZD) | 15 |
| Antioxidant (see the following tests with reference to the above list) | 3 |
| Benzothiazyl-2-cyclohexylsulfenamide | 1.2 |
| Sulfur | 1.6 |

The vulcanization was effected at a temperature of 160°C for the same time as in the above examples.

The tests of the different vulcanizates regarding resistance to cut growth was carried out in accordance with the German norms (DIN 53 522, sheet 3). These tests showed the following values for the number of bends necessary to cause a cut growth from 4 to 8 mm:

| Vulcanizate No.: | 1 | 2 | 3 | 4 |
|---|---|---|---|---|
| Stabilizer: | PBN | IN 78 | IN 77 | IN 69 |
| Number of bends | 5175 | 6800 | 8700 | 6400 |

| Vulcanizate No.: | 5 | 6 | 7 | 9 |
|---|---|---|---|---|
| Stabilizer | IN 43 | IN 44 | IN 57 | IN 40 |
| Number of bends | 7800 | 9200 | 5200 | 5600 |

The same tests were then carried out after ageing of the vulcanizates for 6 days at 100°C in a circulating hot air oven. The following values were obtained in this case for a cut growth from 4 to 8 mm:

| Vulcanizate No.: | 1 | 2 | 3 | 4 |
|---|---|---|---|---|
| Stabilizer | PBN | IN 78 | IN 77 | IN 69 |
| Number of bends | 900 | 2300 | 1620 | 1005 |

| Vulcanizate No.: | 5 | 6 | 7 | 8 |
|---|---|---|---|---|
| Stabilizer | IN 43 | IN 44 | IN 57 | IN 40 |
| Number of bends | 1010 | 1800 | 1120 | 1230 |

All vulcanizates of the invention were then tested for discoloration under the action of light as described in Example II. All compounds of the invention proved to be nondiscoloring.

The following further Example shows that a combination of fatigue reducing action and age protection (antioxidant effect) can be obtained with a plurality of naphthylamino triazines.

EXAMPLE VII

The stabilizers (antioxidants) tested in this Example were the following:
1. PBN (as comparison)
2. IN 66 = 2-$\alpha$-naphthylamino-4-chloro-6-tert.-butylamino-s-triazine
3. IN 67 = 2-$\alpha$-naphthylamino-4-chloro-6-isopropylamino-s-triazine
4. IN 64 = 2-$\alpha$-naphthylamino-4-chloro-6-ethylamino-2-triazine
5. IN 65 = 2-$\alpha$-naphthylamino-4-chloro-6-dihydroxyethylamino-2-triazine
6. IN 55 = 2-$\beta$-naphthylamino-4-chloro-6-ethylamino-s-triazine
7. IN 56 = 2-$\beta$-naphthylamino-4-chloro-6-n-butylamino-s-triazine
8. IN 52 = 2-$\beta$-naphthylamino-4-chloro-6-diallylamino-s-triazine
9. IN 53 = 2.4.-bis-$\beta$-naphthylamino-6-chloro-s-triazine
10. IN 54 = 2-$\beta$-naphthylamino-4-chloro-6-methylthio-s-triazine The vulcanizates were made as described in Example III and were tested for their resistance to ageing and fatigue. The vulcanization was again carried out during the time given in Example III at a temperature of 160°C.

The fatigue protection obtained in unaged condition showed the following values for a cut growth from 4 to 8 mm:

| Vulcanizate No.: | 1 | 2 | 3 | 4 | 5 |
|---|---|---|---|---|---|
| Stabilizer: | PBN | IN 66 | IN 67 | IN 64 | IN 65 |
| Number of Bends: | 5175 | 7600 | 8800 | 5700 | 7700 |

| Vulcanizate No.: | 6 | 7 | 8 | 9 | 10 |
|---|---|---|---|---|---|
| Stabilizer: | IN 55 | IN 56 | IN 52 | IN 53 | IN 54 |
| Number of Bends: | 11000 | 9900 | 7100 | 8000 | 8500 |

The same type of compounds were then aged for 6 days at 100°C in a circulating hot air oven. The number of bends which caused a cut growth from 4 to 8 mm and the increase in the Shore hardness was then determined after aging and showed the following results:

| Vulcanizate No.: | 1 | 2 | 3 | 4 | 5 |
|---|---|---|---|---|---|
| Stabilizer: | PBN | IN 66 | IN 67 | IN 64 | IN 65 |
| Number of bends: | 900 | 1360 | 1900 | 1540 | 1240 |
| Increase of Shore-A-hardness (in points) | 10 | 5 | 4 | 6 | 8 |
| Vulcanizate No.: | 6 | 7 | 8 | 9 | 10 |
| Stabilizer: | IN 55 | IN 56 | IN 52 | IN 53 | IN 54 |
| Number of bends: | 4200 | 2960 | 3900 | 3400 | 3550 |
| Increase of Shore-A-hardness (in points) | 4 | 6 | 6 | 4 | 1 |

All of the compounds of this Example were furthermore tested regarding discoloration under the action of light. The test was carried out by means of a Xeno test method as described in Example 2. It was found that all vulcanizates containing the stabilizers of the invention were practically free of discoloration.

The naphthylamino triazine stabilizers of the invention can be used in carbon black containing as well as light colored articles of the rubber industry and as in the production of rubber tires for vehicles of all kinds.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A 1,3,5-triazine derivative of the formula:

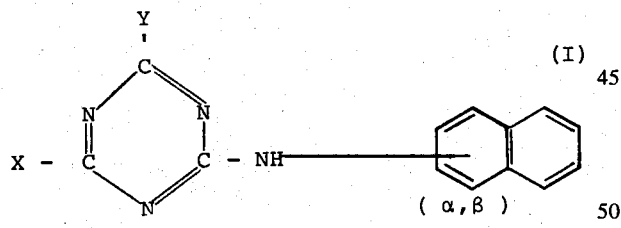

wherein X is

or —SR$^6$, and Y is

or —SR$^7$,
R$^1$, R$^2$, R$^3$ and R$^4$ being hydrogen, alkyl of 1 to 18 carbon atoms, phenyl, allyl or methallyl alkyl may be substituted by —OH, —OR$^5$ (R$^5$ being lower alkyl) or —CN and wherein R$^1$ and R$^3$ may also be α-naphthyl or β-naphthyl with the provision that the R$^2$ or R$^4$ group which is attached to the same N must then be hydrogen; and wherein R$^6$ and R$^7$ are alkyl of 1 to 18 carbon atoms or a thioether group of the formula C$_n$H$_{2n+1}$—S—CH$_2$—CH$_2$—, n being 1 to 18 and with the further proviso that when R$^1$ and R$^2$ are both alkyl then R$^3$ and R$^4$ are not alkyl.

2. A compound according to claim 1 wherein X is —SR$^6$.

3. A compound according to claim 2 wherein Y is —SR$^7$.

4. A compound according to claim 3 which is 2-α-naphthylamino-4,6-bismethylmercapto-triazine.

5. A compound according to claim 3 which is 2-β-naphthylamino-4,6-bismethylmercapto-triazine.

6. A compound according to claim 3 which is 2-α-naphthylamino-4,6-bis-n-dodecylthio-triazine.

7. A compound according to claim 2 wherein Y is N$_{R^4}$-$^{R^3}$.

8. A compound according to claim 7 which is 2-α-naphthylamino-4-alkylamino-6-n-octylthio-triazine.

9. A compound according to claim 1 wherein X is —N$_{R^2}$-$^{R^1}$.

10. A compound according to claim 9 wherein Y is —SR$^7$.

11. A compound according to claim 10 which is 2,6-bis-β-naphthylamino-4-methylthio-triazine.

12. A compound according to claim 10 which is 2,6-bis-α-naphthylamino-4-methylthio-triazine.

13. A compound according to claim 9 wherein Y is —N$_{R^4}$-$^{R^3}$.

14. A compound according to claim 13 wherein at least one of R$^1$, R$^2$, R$^3$ and R$^4$ is allyl or methallyl and the remaining members of R$^1$, R$^2$, R$^3$ and R$^4$ are hydrogen allyl or methallyl.

15. A compound according to claim 13 which is 2-α-naphthylamino-4,6-bis-alkylamino-triazine.

16. A compound accoding to claim 13 which is 2-β-naphthylamino-4,6-bis-alkylamino-triazine.

17. A 1,3,5-triazine derivative of the formula

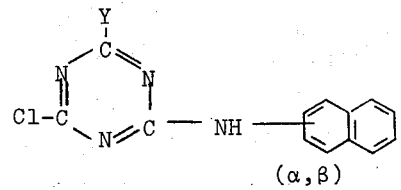

wherein Y is

or —SR$^7$, and R$^3$ and R$^4$ being hydrogen, alkyl of 1 to 18 carbon atoms, allyl, or methallyl, alkyl substituted by —CN, —OH or —OR$^5$ where R$^5$ is lower alkyl; and wherein R$^6$ and R$^7$ are alkyl of 1 to 18 carbon atoms or a thioether group of the formula

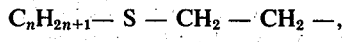

n being 1 to 18.

18. A compound according to claim 17 wherein Y is —SR$^7$.

19. A compound according to claim 18 which is 2-β-naphthylamino-4-chloro-6-methylthio-triazine.

20. A compound according to claim 18 wherein Y is $-N_{R^4}{-}^{R^3}$.

21. A compound according to claim 20 wherein $R^3$ is hydrogen and $R^4$ is alkyl of 1 to 18 carbon atoms.

22. A compound according to claim 21 which is 2-α-naphthylamino-4-chloro-6-n-butylamino-triazine.

23. A compound according to claim 20 wherein $R^3$ and $R^4$ are hydrogen or alkyl of 1 to 18 carbon atoms.

24. A compound according to claim 20 wherein one of $R^3$ and $R^4$ is alkyl and the other is hydrogen or alkyl.

25. A compound according to claim 24 which is 2-α-naphthylamino-4-chloro-6-alkylamino-triaine.

26. A compound according to claim 24 which is 2-β-naphthylamino-4-chloro-6-alkylamino-triazine.

27. A compound according to claim 24 which is 2-α-naphthylamino-4-chloro-6-diallylamino-triazine.

28. A compound according to claim 24 which is 2-β-naphthylamino-4-chloro-6-diallylamino-triazine.

29. A compound according to claim 20 which is 2-α-naphthylamino-4-chloro-6-amino-triazine.

30. A compound according to claim 20 which is 2-β-naphthylamino-4-chloro-6-amino-triazine.

* * * * *